United States Patent Office 3,335,008
Patented Aug. 8, 1967

3,335,008
PHOTOGRAPHIC ELEMENTS CONTAINING FERROCENE DERIVATIVE AND METHOD OF PROCESSING
Jean-Pierre Camille Gérard Dubosc, Paris, France, assignor to Eastman Kodak Company, Rochester, N.Y., a corporation of New Jersey
No Drawing. Filed Apr. 2, 1964, Ser. No. 356,926
10 Claims. (Cl. 96—49)

ABSTRACT OF THE DISCLOSURE

Unsaturated ferrocene derivatives are used to prepare new, negative-positive photographic elements which can be developed by solvent means. The scope of this invention is defined by the following specification and claims.

The present invention concerns new photographic elements and methods for processing such elements.

It is an object of this invention to provide a novel useful photographic system wherein silver salts are not utilized.

It is another object of this invention to provide a new process for preparing photographic images wherein the processing or image fixing can be effected by treating the exposed photographic element with a suitable solvent.

It is likewise an object of this invention to provide a new negative-positive system.

These and other objects of the invention are accomplished with photographic elements comprising a support having coated thereon a light-sensitive ferrocene derivative having the formula

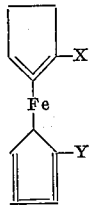

wherein X and Y are each either a hydrogen atom or a radical having the formula

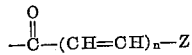

wherein Z is a phenyl radical and $n$ is an integer of 1 to 2, and at least one of X and Y is the previously described radical having the formula

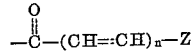

Z can be an unsubstituted phenyl radical or a substituted phenyl radical containing such substituents as dialkylamino radicals like dimethylamino radicals, as well as such alkoxy radicals as hydroxyethoxy radicals, and the like.

The above-described ferrocene derivatives, dissolved in a polar solvent, are coated on a photographic support. The solvent is thereafter removed by conventional drying methods to leave the light-sensitive ferrocene derivative substantially uniformly coated on the support. The resulting photographic element can be image exposed to prepare a negative image or through a negative to prepare a positive image. On exposure to actinic radiation, the ferrocene derivative in the exposed image areas of the photographic element is converted to a compound which is substantially less soluble in the solvent used to coat the ferrocene derivative than the ferrocene derivative in the unexposed areas. Generally, in the present process, a color change of the ferrocene derivative in the areas of exposure takes place, and which color change accompanies the aforementioned solubility change of the ferrocene derivative. A permanent image on the support can thereafter be obtained by treating the image exposed photographic element with a solvent of the type used to coat the original light-sensitive ferrocene derivative on the support.

The sensitivity of the subject ferrocene derivatives can be substantially enhanced by admixing therewith sensitizing amounts of iodoform.

The ferrocene derivatives used in preparing the photographic elements are prepared in the absence of, or substantially subdued, light or actinic radiation that they are sensitive to. Ferrocene derivatives are mainly sensitive to ultraviolet radiation and the shorter wavelengths of the visible spectrum.

A wide variety of solvents can be utilized to dissolve and coat the present ferrocene derivatives on photographic supports and to process the image-exposed photographic elements. Suitable solvents could be readily ascertained by one skilled in the art. Generally, such solvents are polar solvents such as lower alkanols like ethanol and methanol and lower alkyl ketones such as acetone. Likewise, water having an acidic pH can be suitably used as the solvent for coating and processing for some of the subject ferrocene derivatives, particularly the ferrocene derivatives containing dialkylamino-substituted phenyl radicals.

A wide variety of photographic supports can be utilized in preparing the subject photographic elements. Desirably, photographic supports that can be used to imbibe therein solutions of the subject ferrocene derivatives are utilized. Photographic supports containing such materials as baryta dispersed in gelatin can be utilized to imbibe the light-sensitive ferrocene derivative. Typical suitable photographic supports thus include paper, cellulose acetate, and the like photographic supports.

The invention is illustrated by the following examples of preferred embodiments thereof.

EXAMPLE I

A saturated ethanol solution of cinnamoyl ferrocene (prepared in the absence of actinic radiation) was coated on a non-baryta paper and left to dry. The resulting photographic element was exposed imagewise for 2 minutes and 30 seconds to sunlight. A yellow image on a red background was formed. This yellow image was thereafter fixed by washing with methanol which dissolved the unexposed red regions of the photographic element to leave only the paper support in the positive image areas and a yellow image in the areas of exposure to the sunlight or the negative image areas.

EXAMPLE II

A saturated ethanol solution of cinnamoyl ferrocene (prepared in the absence of actinic radiation) was coated on a baryta (barium sulfate dispersed in gelatin) paper and dried to obtain a reddish-tinted paper. The resulting photographic element was exposed to sunlight under a negative image. After 3 minutes an image appeared in the areas of exposure, which image became distinctly visible after 5 minutes of exposure. Thereafter, the exposed photographic element was washed in methanol for 5 minutes leaving a positive image on a pale red base. The photographic element was thereafter washed for about 2 hours in ethanol and the pale red base in the unexposed areas was removed to leave only an image in the areas of exposure on the support. The exposure to the image was repeated with similar results by substituting a flash bulb for the sunlight and by substituting acetone for the ethanol as the solvent for coating the cinnamoyl ferrocene and for processing the exposed element.

EXAMPLE III

A saturated methanolic solution of cinnamoyl ferrocene (prepared in the absence of actinic radiation) was coated on a cellulose triacetate film support. The prepared photographic element was exposed for 5 minutes to sunlight through a negative. The resulting exposed photographic element was washed with methanol and a positive yellow image was obtained in the areas of exposure, the unexposed cinnamoyl ferrocene being removed by the methanol solvent.

EXAMPLE IV

A saturated ethanol solution of cinnamoyl ferrocene (prepared in the absence of actinic radiation) containing a sensitizing amount of iodoform was coated on baryta-coated paper. The coating solvent was allowed to evaporate to leave a light-sensitive photographic element, which after 15 seconds exposure to sunlight, produced a visible image which increased to high contrast after a one minute exposure. The image in the areas of exposure appeared green on a red base before development, the image turning yellow-brown on treatment with methanol. Methanol was used to dissolve and remove the soluble cinnamoyl ferrocene in the unexposed regions of the photographic element.

EXAMPLE V

A wide variety of ferrocene derivatives can be substituted for the cinnamoyl ferrocene described in Examples I to IV. Several typical ferrocene derivatives of the invention were dissolved in ethanol at a 0.5% concentration and coated on baryta-coated paper at coverages equivalent to that obtained by coating 2 cc. of the solution on an area 25 square centimeters. The coatings were image exposed to a 500-watt lamp ("Mazdactina") emitting substantial amounts of actinic radiation at a distance of about 4 inches until a visible image appeared in the areas of exposure. The table below summarizes the results in the terms of lengths of exposure required for the photographic elements containing the various ferrocene derivatives.

Table

| Ferrocene compound: | Length of exposure |
|---|---|
| p-N,N-dimethylaminocinnamoyl ferrocene | 11 min. |
| 1,1' - bis-(p-N,N-dimethylaminocinnamoyl) ferrocene | 2 min., 15 sec. |
| 5 - phenyl-penta-2,4-diene-1-one ferrocene | 7 min. |
| 1,1'-bis-(5-phenyl-penta - 2,4 - diene-1-one) ferrocene | 5 min. |

The present ferrocene derivatives can be prepared by techniques known in the art. Examples VI to X below illustrate typical methods for preparing the subject ferrocene derivatives.

EXAMPLE VI

*Preparation of p-N,N-dimethylaminocinnamoyl ferrocene*

This compound is obtained by reacting monoacetylferrocene with p-N,N-dimethylaminobenzaldehyde. In a reaction flask fitted with a reflux condenser, the following are introduced: 4 g. of caustic soda, 70 ml. of ethanol, 4.6 g. of monoacetylferrocene and 2.98 g. of p-N,N-dimethylaminobenzaldehyde. The reactants are allowed to react for 24 hours at room temperature and protected from light. The reaction mixture is filtered and the precipitate obtained is washed with water and then recrystallized with methylene chloride. The p-N,N-dimethylaminocinnamoyl ferrocene is thus obtained. The monoacetylferrocene used in this example is prepared in a reaction flask fitted with a gas-bubbling pipe in an atmosphere of dry nitrogen. 640 ml. of anhydrous distilled methylene chloride, 74.4 g. of ferrocene and 81.6 g. of acetyl chloride are added to the flask, the contents of the flask are cooled to 0° C., a slow current of boron fluoride supplied by a bottle under pressure is added to the flask, and the resulting reaction medium is stirred to saturate it with the boron fluoride. After 2½ hours, strong white fumes formed in the reaction flask; this indicating that saturation has been reached. The reaction flask is allowed to return to room temperature and agitation is continued for about 15 hours. Then the reaction flask is cooled to about 5° C. and its contents poured into an aqueous saturated solution of cold sodium acetate. The water phase and the organic phase are separated by decanting and the aqueous phase is washed three times with methylene chloride. All of the organic solutions are collected together and dried over anhydrous sodium carbonate and the solvent removed by distillation. The residue of the distillation is dissolved in hexane and recrystallized to yield the monoacetylferrocene.

EXAMPLE VII

*Preparation of 1,1'-bis-(p,N,N-dimethylamino cinnamoyl(ferrocene*

This preparation is carried out in a manner similar to that described in Example VI by condensing 2.7 g. of diacetylferrocene and 2.98 g. of p-N,N-dimethylaminobenzaldehyde in the presence of 4 g. of caustic soda and 60 ml. of ethanol. The 1,1'-bis-(p-N,N-dimethylaminocinnamoyl(ferrocene is thus obtained. The diacetylferrocene used in this example is prepared by carrying out the reaction in an atmosphere of dry nitrogen in a reaction flask fitted with a reflux condenser connected to a double bubbler, an arrangement for absorbing the hydrochloric acid vapors. A 50 g. portion of acetyl chloride is added to the reaction flask. Then 1000 ml. of distilled carbon sulfide is added to the reaction flask. Thereafter, 88 g. of anhydrous aluminum chloride is slowly added to the reaction mixture. The reaction mixture is stirred overnight, the contents of the flask becoming brownish-black. The contents of the flask are then poured onto crushed ice and hydrochloric acid. The organic layer is decanted and the aqueous layer is washed several times with methylene chloride. The organic layer and the washed layers are collected and combined, dried over anhydrous calcium sulfate and the solvent removed by distillation. A black residue remains which is extracted with petroleum ether. The diacetylferrocene in this extract is crystallized and purified by several crystallizations.

EXAMPLE VIII

*Preparation of (5-phenyl-penta-2,4-diene-1-one)ferrocene*

This preparation is carried out in a similar manner to that described in Example VI by using 4 g. of caustic soda, 60 ml. of ethanol, 4.6 g. of monoacetylferrocene and 2.6 g. of cinnamic aldehyde.

EXAMPLE IX

*Preparation of 1,1'-bis-(5-phenyl-penta-2,4-diene-1-one) ferrocene*

This preparation is carried out in a similar manner to that described in Example VIII by using 2.7 g. of diacetylferrocene and 2.64 g. of cinnamic aldehyde.

EXAMPLE X

*Preparation of 1,1'-bis-(hydroxyethoxycinnamoyl) ferrocene*

This preparation is effected by condensing 13.5 g. of diacetylferrocene and 16.6 g. of p-hydroxyethoxybenzaldehyde in the presence of 10 g. of caustic soda in 700 ml. of ethanol and 100 ml. of water. After agitation at room temperature for about 24 hours, and double recrystallization in methanol, 1,1'-bis-(hydroxyethoxycinnamoyl)ferrocene is obtained.

The invention has been described in considerable detail with particular reference to preferred embodiments thereof, but it will be understood that variations and modifications can be effected within the spirit and scope of the invention as described hereinabove and as defined in the appended claims.

I claim:
1. A photographic element comprising a support having coated thereon a light-sensitive ferrocene derivative having the formula

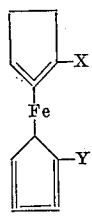

wherein X and Y are each selected from the group consisting of a hydrogen atom and a radical having the formula

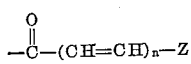

wherein Z is a phenyl radical and $n$ is an integer of 1 to 2, at least one of X and Y being said radical having the formula

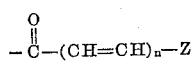

2. A photographic element as described in claim 1 wherein the ferrocene derivative is p-dimethylaminocinnamoyl ferrocene.
3. A photographic element as described in claim 1 wherein the ferrocene derivative is 1,1'-bis-(p-dimethylaminocinnamoyl) ferrocene.
4. A photographic element as described in claim 1 wherein the ferrocene derivative is 5-phenyl-2,4-pentadiene-1-one) ferrocene.
5. A photographic element as described in claim 1 wherein the ferrocene derivative is 1,1'-bis-(5-phenyl-2,4-pentadiene-1-one) ferrocene.
6. A photographic element as described in claim 1 wherein the ferrocene derivative is cinnamoyl ferrocene.
7. A photographic element as described in claim 1 wherein a sensitizing amount of iodoform is admixed with the ferrocene derivative.
8. A photographic element as described in claim 1 wherein the support is baryta-coated paper.
9. The process which comprises exposing to an image a photograhic element as described in claim 1 and forming a ferrocene derivative image in the areas of exposure that is substantially less soluble in polar solvents than the ferrocene derivative in unexposed areas, and thereafter treating the exposed photographic element with a polar solvent to remove ferrocene derivative in unexposed image areas and retain exposed image areas of ferrocene derivative on the support.
10. A process as described in claim 9 wherein the solvent is selected from the group consisting of methanol, ethanol and acetone.

References Cited

De Belder et al.: Chem. and Ind., 1959, p. 996.
Journal of Applied Polymer Science, VII (1963), 1565–80.
Rosenblum, Myron: Chemistry of the Iron Group Metallocenes, part one, New York, John Wiley and Sons, 1965, pp. 92–93.

NORMAN G. TORCHIN, *Primary Examiner.*
C. E. DAVIS, *Assistant Examiner.*

UNITED STATES PATENT OFFICE
CERTIFICATE OF CORRECTION

Patent No. 3,335,008　　　　　　　　　　　　August 8, 1967

Jean-Pierre Camille Gerard Dubosc

It is hereby certified that error appears in the above numbered patent requiring correction and that the said Letters Patent should read as corrected below.

Column 1, lines 34 to 43, the formula should appear as shown below instead of as in the patent:

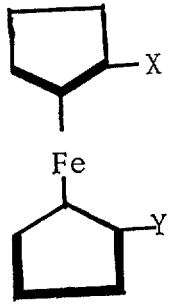

column 5, lines 5 to 13, the formula should appear as shown below instead of as in the patent:

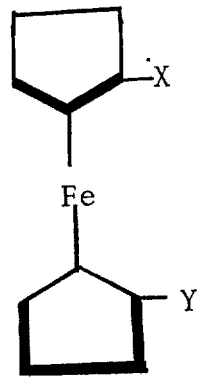

Signed and sealed this 26th day of November 1968.

(SEAL)
Attest:

EDWARD M. FLETCHER, JR.
Attesting Officer

EDWARD J. BRENNER
Commissioner of Patents